United States Patent
Yang et al.

(10) Patent No.: US 9,337,455 B2
(45) Date of Patent: *May 10, 2016

(54) MIDDLE OR LARGE-SIZED BATTERY MODULE

(75) Inventors: Heekook Yang, Daejeon (KR); Jongmoon Yoon, Daejeon (KR); Seungjae You, Daejeon (KR); Junill Yoon, Seoul (KR)

(73) Assignee: LG Chem, Ltd. (KR)

(*) Notice: Subject to any disclaimer, the term of this patent is extended or adjusted under 35 U.S.C. 154(b) by 630 days.

This patent is subject to a terminal disclaimer.

(21) Appl. No.: 12/224,687

(22) PCT Filed: Feb. 28, 2007

(86) PCT No.: PCT/KR2007/001016
§ 371 (c)(1),
(2), (4) Date: Aug. 18, 2009

(87) PCT Pub. No.: WO2007/102669
PCT Pub. Date: Sep. 13, 2007

(65) Prior Publication Data
US 2010/0021802 A1    Jan. 28, 2010

(30) Foreign Application Priority Data
Mar. 6, 2006  (KR) .................. 10-2006-0020772

(51) Int. Cl.
*H01M 10/48* (2006.01)
*H01M 2/10* (2006.01)
(Continued)

(52) U.S. Cl.
CPC .......... *H01M 2/1077* (2013.01); *H01M 2/0212* (2013.01); *H01M 2/206* (2013.01); *H01M 10/48* (2013.01); *H01M 10/486* (2013.01); *H01M 2/0275* (2013.01); *H01M 2/1061* (2013.01)

(58) Field of Classification Search
CPC ............ H01M 2/0245; H01M 2/0267; H01M 2/0275; H01M 2/206; H01M 2/1077; H01M 10/486
USPC .......................................... 429/159, 158, 153
See application file for complete search history.

(56) References Cited

U.S. PATENT DOCUMENTS 4,278,744 A * 7/1981 Athearn ..................... 429/181
4,957,829 A * 9/1990 Holl ............................ 429/99
(Continued)

FOREIGN PATENT DOCUMENTS

EP          957526 A1    11/1999
JP       61-171065 A     8/1986
(Continued)

OTHER PUBLICATIONS

Office Action from Korean Patent Application No. 10-2006-0020772 dated Feb. 4, 2010.
(Continued)

*Primary Examiner* — Ula C Ruddock
*Assistant Examiner* — Lisa S Park
(74) *Attorney, Agent, or Firm* — Lerner, David, Littenberg, Krumholz & Mentlik, LLP

(57) ABSTRACT

A middle- or large-sized battery module includes two or more unit modules each having one or more plate-shaped battery cells, as unit cells, surrounded by a high-strength sheathing member made of synthetic resin or metal, and separable upper and lower frame members coupled with each other in an assembly-type coupling structure such that the unit modules are vertically mounted in the upper and lower frame members. A sensing unit capable of minimizing the weight and size of battery cells is easily mounted while effectively reinforcing the low mechanical strength of the battery cells and sensing the operation state of the battery cells to a middle- or large-sized battery module. The battery module is manufactured by a simple assembly process without using a plurality of members for mechanical coupling and electrical connection.

17 Claims, 8 Drawing Sheets

(51) Int. Cl.
*H01M 2/02* (2006.01)
*H01M 2/20* (2006.01)

(56) References Cited

U.S. PATENT DOCUMENTS

| | | | |
|---|---|---|---|
| 5,366,827 | A | 11/1994 | Belanger et al. |
| 5,437,939 | A | 8/1995 | Beckley |
| 5,510,203 | A * | 4/1996 | Hamada et al. ............... 429/53 |
| 5,558,950 | A | 9/1996 | Ovshinsky et al. |
| 5,639,571 | A * | 6/1997 | Waters et al. ................ 429/71 |
| 5,981,101 | A | 11/1999 | Stone |
| 6,191,591 | B1 | 2/2001 | Ratajczak et al. |
| 6,225,778 | B1 | 5/2001 | Hayama et al. |
| 6,304,057 | B1 | 10/2001 | Hamada et al. |
| 6,379,837 | B1 * | 4/2002 | Takahashi et al. ............ 429/151 |
| 6,410,184 | B1 | 6/2002 | Horiuchi et al. |
| 6,482,544 | B1 | 11/2002 | Shiota et al. |
| 6,569,561 | B1 * | 5/2003 | Kimura et al. ............... 429/159 |
| 6,773,848 | B1 | 8/2004 | Nortoft et al. |
| 6,818,343 | B1 | 11/2004 | Kimoto et al. |
| 6,896,995 | B2 | 5/2005 | Saito |
| 7,597,996 | B2 | 10/2009 | Ro et al. |
| 7,648,538 | B2 | 1/2010 | Oogami et al. |
| 7,892,669 | B2 | 2/2011 | Yang et al. |
| 8,329,324 | B2 | 12/2012 | Lee et al. |
| 2002/0009649 | A1 * | 1/2002 | Sato et al. .................... 429/306 |
| 2002/0150815 | A1 | 10/2002 | Ehara |
| 2002/0182480 | A1 | 12/2002 | Hanauer et al. |
| 2003/0048090 | A1 | 3/2003 | Sato et al. |
| 2003/0215702 | A1 | 11/2003 | Tanjou et al. |
| 2004/0021442 | A1 * | 2/2004 | Higashino .................... 320/112 |
| 2004/0033415 | A1 | 2/2004 | Chen et al. |
| 2004/0036444 | A1 | 2/2004 | Oogami |
| 2004/0050414 | A1 | 3/2004 | Oogami |
| 2004/0055922 | A1 | 3/2004 | Ordonez |
| 2004/0119442 | A1 | 6/2004 | Lee et al. |
| 2004/0253512 | A1 | 12/2004 | Watanabe et al. |
| 2005/0031946 | A1 | 2/2005 | Kruger et al. |
| 2005/0069763 | A1 | 3/2005 | Hong et al. |
| 2005/0089751 | A1 | 4/2005 | Oogami et al. |
| 2005/0100783 | A1 | 5/2005 | Ro et al. |
| 2005/0110460 | A1 | 5/2005 | Arai et al. |
| 2005/0215296 | A1 | 9/2005 | Fujihara et al. |
| 2006/0040173 | A1 * | 2/2006 | Shimamura et al. ............ 429/99 |
| 2006/0061330 | A1 * | 3/2006 | Sato et al. .................... 320/125 |
| 2006/0093899 | A1 | 5/2006 | Jeon et al. |
| 2006/0176014 | A1 | 8/2006 | Moon |
| 2006/0177734 | A1 | 8/2006 | Yao |
| 2006/0183017 | A1 | 8/2006 | Kanai |
| 2007/0134551 | A1 * | 6/2007 | Cyr et al. ..................... 429/160 |

FOREIGN PATENT DOCUMENTS

| | | |
|---|---|---|
| JP | 10-129276 A | 5/1998 |
| JP | 2002-313398 | 10/2002 |
| JP | 2003-68259 A | 3/2003 |
| JP | 2003-123721 A | 4/2003 |
| JP | 2005-108693 | 4/2005 |
| JP | 2005-122927 A | 5/2005 |
| JP | 2005-197179 A | 7/2005 |
| JP | 2005-209365 A2 | 8/2005 |
| JP | 2005-222701 A | 8/2005 |
| JP | 2005-293907 A | 10/2005 |
| JP | 2005-302501 A | 10/2005 |
| JP | 2006-66322 | 3/2006 |
| JP | 3891860 B2 | 3/2007 |
| KR | 20060047061 A | 5/2006 |
| TW | 2004-14583 | 8/2001 |
| TW | 543217 B | 7/2003 |
| TW | 2006-03456 | 1/2006 |
| WO | 03/019703 A1 | 3/2003 |
| WO | 2004/049470 A2 | 6/2004 |
| WO | WO-2005/074054 A1 | 8/2005 |
| WO | 2006/030659 A1 | 3/2006 |
| WO | 2006/059434 A1 | 6/2006 |
| WO | 2007079449 A2 | 7/2007 |
| WO | 2007091757 A1 | 8/2007 |

OTHER PUBLICATIONS

U.S. Appl. No. 12/224,688.
U.S. Appl. No. 12/224,526.
U.S. Appl. No. 12/224,689.

* cited by examiner

MIDDLE OR LARGE-SIZED BATTERY MODULE

CROSS REFERENCE TO RELATED APPLICATIONS

The present application is a national phase entry under 35 U.S.C. §371 of International Application No. PCT/KR2007/001016, filed Feb. 28, 2007, published in English, which claims priority from Korean Patent Application No. 10-2006-0020772, filed Mar. 6, 2006. The disclosures of said applications are incorporated by reference herein.

FIELD OF THE INVENTION

The present invention relates to a middle- or large-sized battery module, and, more particularly, to a middle- or large-sized battery module including two or more unit modules each having one or more plate-shaped battery cells, as unit cells, surrounded by a high-strength sheathing member made of synthetic resin or metal, and separable upper and lower frame members coupled with each other in an assembly-type coupling structure such that the unit modules are vertically mounted in the upper and lower frame members.

BACKGROUND OF THE INVENTION

Recently, a secondary battery, which can be charged and discharged, has been widely used as an energy source for wireless mobile devices. Also, the secondary battery has attracted considerable attention as an energy source for electric vehicles (EV) and hybrid electric vehicles (HEV), which have been developed to solve problems, such as air pollution, caused by existing gasoline and diesel vehicles using fossil fuel.

Small-sized mobile devices use one or several small-sized battery cells for each device. On the other hand, middle- or large-sized devices, such as vehicles, use a middle- or large-sized battery module having a plurality of battery cells electrically connected with each other because high output and large capacity are necessary for the middle- or large-sized devices.

Preferably, the middle- or large-sized battery module is manufactured with small size and small weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small and the manufacturing costs of the pouch-shaped battery are low.

FIG. 1 is a perspective view typically illustrating a conventional representative pouch-shaped battery. The pouch-shaped battery 10 shown in FIG. 1 is constructed in a structure in which two electrode leads 11 and 12 protrude from the upper and lower ends of a battery body 13, respectively, while the electrode leads 11 and 12 are opposite to each other. A sheathing member 14 comprises upper and lower sheathing parts. That is, the sheathing member 14 is a two-unit member. An electrode assembly (not shown) is received in a receiving part which is defined between the upper and lower sheathing parts of the sheathing member 14. The opposite sides 14a and the upper and lower ends 14b and 14c, which are contact regions of the upper and lower sheathing parts of the sheathing member 14, are bonded to each other, whereby the pouch-shaped battery 10 is manufactured. The sheathing member 14 is constructed in a laminate structure of a resin layer/a metal film layer/a resin layer. Consequently, it is possible to bond the opposite sides 14a and the upper and lower ends 14b and 14c of the upper and lower sheathing parts of the sheathing member 14, which are in contact with each other, to each other by applying heat and pressure to the opposite sides 14a and the upper and lower ends 14b and 14c of the upper and lower sheathing parts of the sheathing member 14 so as to weld the resin layers thereof to each other. According to circumstances, the opposite sides 14a and the upper and lower ends 14b and 14c of the upper and lower sheathing parts of the sheathing member 14 may be bonded to each other using a bonding agent. For the opposite sides 14a of the sheathing member 14, the same resin layers of the upper and lower sheathing parts of the sheathing member 14 are in direct contact with each other, whereby uniform sealing at the opposite sides 14a of the sheathing member 14 is accomplished by welding. For the upper and lower ends 14b and 14c of the sheathing member 14, on the other hand, the electrode leads 11 and 12 protrude from the upper and lower ends 14b and 14c of the sheathing member 14, respectively. For this reason, the upper and lower ends 14b and 14c of the upper and lower sheathing parts of the sheathing member 14 are thermally welded to each other, while a film-shaped sealing member 16 is interposed between the electrode leads 11 and 12 and the sheathing member 14, in consideration of the thickness of the electrode leads 11 and 12 and the difference in material between the electrode leads 11 and 12 and the sheathing member 14, so as to increase sealability of the sheathing member 14.

However, the mechanical strength of the sheathing member 14 is low. In order to solve this problem, there has been proposed a method of mounting battery cells (unit cells) in a pack case, such as a cartridge, so as to manufacture a battery module having a stable structure. However, a device or a vehicle, in which a middle- or large-sized battery module is installed, has a limited installation space. Consequently, when the size of the battery module is increased due to the use of the pack case, such as the cartridge, the spatial utilization is lowered. Also, due to the low mechanical strength, the battery cells repeatedly expand and contract during the charge and the discharge of the battery cells. As a result, the thermally welded regions of the sheathing member may be easily separated from each other.

Also, since a battery module is a structural body including a plurality of battery cells which are combined with each other, the safety and the operating efficiency of the battery module are lowered when overvoltage, overcurrent, and overheat occurs in some of the battery cells. Consequently, a sensing unit for sensing the overvoltage, overcurrent, and overheat is needed. Specifically, a voltage or temperature sensor is connected to the battery cells so as to sense and control the operation of the battery cells in real time or at predetermined time intervals. However, the attachment or the connection of the sensing unit complicates the assembly process of the battery module. In addition, short circuits may occur due to the provision of a plurality of wires necessary for the attachment or the connection of the sensing unit.

In addition, when a middle- or large-sized battery module is constructed using a plurality of battery cells or a plurality of unit modules each of which includes a predetermined number of battery cells, a plurality of members for mechanical coupling and electrical connection between the battery cells or the unit modules are needed, and a process for assembling the mechanical coupling and electrical connection members is very complicated. Furthermore, there is needed a space for coupling, welding, or soldering the mechanical coupling and electrical connection members with the result that the total size of the system is increased. The increase in size of the system is not preferred in the above-described aspect. Consequently, there is high necessity for a middle- or large-sized battery module that is compact and structurally stable.

SUMMARY OF THE INVENTION

Therefore, the present invention has been made to solve the above problems, and other technical problems that have yet to be resolved.

Specifically, it is an object of the present invention to provide a middle- or large-sized battery module to which a sensing unit that is capable of minimizing the weight and size of battery cells while effectively reinforcing the low mechanical strength of the battery cells and sensing the operation state of the battery cells is easily mounted.

It is another object of the present invention to provide a middle- or large-sized battery module that is manufactured by a simple assembly process without using a plurality of members for mechanical coupling and electrical connection, whereby the manufacturing costs of the middle- or large-sized battery module are lowered, and that is effectively prevented from being short-circuited or damaged during the manufacture or the operation of the middle- or large-sized battery module.

It is a further object of the present invention to provide a middle- or large-sized battery system that is manufactured using the middle- or large-sized battery module as a unit body such that the middle- or large-sized battery system has desired output and capacity.

In accordance with one aspect of the present invention, the above and other objects can be accomplished by the provision of a middle- or large-sized battery module comprising: two or more unit modules each having one or more plate-shaped battery cells, as unit cells, surrounded by a high-strength sheathing member made of synthetic resin or metal; and separable upper and lower frame members coupled with each other in an assembly-type coupling structure such that the unit modules are vertically mounted in the upper and lower frame members.

The plate-shaped battery cells are secondary batteries having a small thickness and a relatively large width and length, such that the total size of the secondary batteries is minimized when the secondary batteries are stacked to construct a battery module. In a preferred embodiment, each plate-shaped battery cell is a secondary battery constructed in a structure in which an electrode assembly is mounted in a battery case made of a laminate sheet including a resin layer and a metal layer, and electrode terminals protrude from upper and lower ends of the battery case. Specifically, each battery cell is constructed in a structure in which the electrode assembly is mounted in a pouch-shaped battery case made of an aluminum laminate sheet. Hereinafter, the secondary battery with the above-stated construction will be referred to as a pouch-shaped battery cell.

The case of the pouch-shaped battery cell may be constructed in various structures. For example, the sheathing member of the pouch-shaped battery may be constructed in a structure in which the electrode assembly is received in a receiving part formed at the upper inner surface and/or the lower inner surface of a two-unit member, and the upper and lower contact regions are sealed. A pouch-shaped battery cell with the above-described construction is disclosed in PCT International Application No. PCT/KR2004/003312, which has been filed in the name of the applicant of the present patent application. The disclosure of the above-mentioned patent application is hereby incorporated by reference as if fully set forth herein.

The electrode assembly comprises cathodes and anodes, by which the charge and the discharge of the battery are possible. The electrode assembly may be constructed in a structure in which the cathodes and the anodes are stacked while separators are disposed respectively between the cathodes and the anodes. For example, the electrode assembly may be constructed in a folding (jelly-roll) type structure, a stacking type structure, or a stacking/folding type structure. The cathodes and the anodes of the electrode assembly may be constructed such that electrode taps of the cathodes and electrode taps of the anodes directly protrude outward from the battery. Alternatively, the cathodes and the anodes of the electrode assembly may be constructed such that the electrode taps of the cathodes and the electrode taps of the anodes are connected to additional leads, and the leads protrude outward from the battery.

The battery cells are surrounded, one by one or two by two, by the high-strength sheathing member made of synthetic resin or metal so as to constitute a unit module. The high-strength sheathing member restrains the repetitive expansion and contraction change of the battery cells during the charge and discharge of the battery cells while protecting the battery cells having low mechanical strength, thereby preventing separation between sealing regions of the battery cells.

The battery cells are connected in series and/or parallel with each other in one unit module, or the battery cells of one unit module are connected in series and/or parallel with the battery cells of another unit module. In a preferred embodiment, a plurality of unit modules are manufactured by coupling electrode terminals of the battery cells to each other, while arranging the battery cells in series in the longitudinal direction, such that the electrode terminals of the battery cells are successively adjacent to each other, bending the battery cells by twos or more such that the battery cells are stacked while being in tight contact with each other, and surrounding the stacked battery cells by predetermined numbers with the sheathing members.

The coupling between the electrode terminals is accomplished in various manners, such as welding, soldering, and mechanical coupling. Preferably, the coupling between the electrode terminals is accomplished by welding.

The unit modules, which are stacked in high integration while the electrode terminals are connected with each other, are vertically mounted in the separable upper and lower frame members that are coupled with each other in the assembly-type coupling structure.

Preferably, the upper and lower frame members are constructed in a structure to surround the edges of the unit modules and expose the outer surfaces of the unit modules to the outside so as to accomplish easy heat dissipation of the unit modules when the upper and lower frame members are coupled with each other after the unit modules are mounted in the upper and lower frame members. Specifically, the upper and lower frame members are open in the lateral direction such that the edges of the unit modules are fixed to the upper and lower frame members.

In a preferred embodiment, the upper and lower frame members are provided at the insides thereof with pluralities of partitions for guiding the vertical mounting operation of the respective unit modules. The partitions may include grooves formed in the inside of the upper and lower frame member such that the edges of the unit modules are inserted into the grooves and/or partition walls for assisting the edges of the unit modules to be stably mounted in the grooves.

The upper and lower frame members are coupled with each other by mounting the unit modules to one of the upper and lower frame members (for example, the lower frame member) and coupling the other frame member (for example, the upper frame member) to the frame member in which the unit modules are mounted. The coupling between the upper and lower frame members may be accomplished in various manners. For example, a hook may be formed at one of the frame members, and a coupling hole corresponding to the hook may be formed in the other frame member, whereby the coupling between the upper and lower frame members is accomplished without using an additional coupling member.

In a battery module including a plurality of battery cells, it is necessary to measure and control the voltage and temperature of the battery cells in consideration of the safety and operational efficiency of the battery module. Especially, it is necessary to measure the voltage of the respective battery cells or the respective electrical connection regions of the battery cells. For this reason, the attachment of a sensing member for measuring the voltage or temperature of the battery cells is one of the principal factors further complicating the construction of the battery module.

The above-mentioned problem may be solved by the provision of a sensing unit mounted along one of the frame members for sensing the voltage and/or temperature of the battery cells in accordance with the present invention.

The electrode terminals of the outermost unit modules among the unit modules mounted in the upper and lower frame members are electrically connected to external circuits or electrode terminals of neighboring battery modules. To this end, input and output terminal bus bars are connected to the electrode terminals of the outermost unit modules. In a preferred embodiment, the bus bars are provided with coupling holes, and at least one of the frame members is provided at the outside thereof with coupling protrusions corresponding to the coupling holes, whereby the bus bars are easily and stably mounted to the electrode terminals.

The battery module according to the present invention further comprises a device (a so-called battery management system) for controlling the operation of the battery module. Preferably, the battery management system (BMS) is mounted at the opposite side (the rear of the battery module) to the side where the input and output terminal bus bars are located. When a plurality of battery modules are used to construct a middle- or large-sized battery system, as will be described below, BMSs mounted to the respective battery modules may be said to be 'slave BMSs.'

The middle- or large-sized battery module according to the present invention is constructed in a compact structure, and the mechanical coupling and electrical connection of the middle- or large-sized battery module are stably accomplished without using a plurality of members. Also, it is possible to construct a battery module using a predetermined number of battery cells, for example, four, six, eight, or ten battery cells, thereby effectively mounting a necessary number of battery modules in a limited space.

In accordance with another aspect of the present invention, there is provided a middle- or large-sized battery system having high output and large capacity, the battery system being constructed by connecting a plurality of battery modules.

The middle- or large-sized battery system according to the present invention may be manufactured by combining unit modules based on desired output and capacity. The battery system according to the present invention is preferably used in electric vehicles, hybrid electric vehicles, electric motorcycles, or electric bicycles that have a limit installation space and are exposed to frequent vibration and strong impact in consideration of the installation efficiency and structural stability of the battery system.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
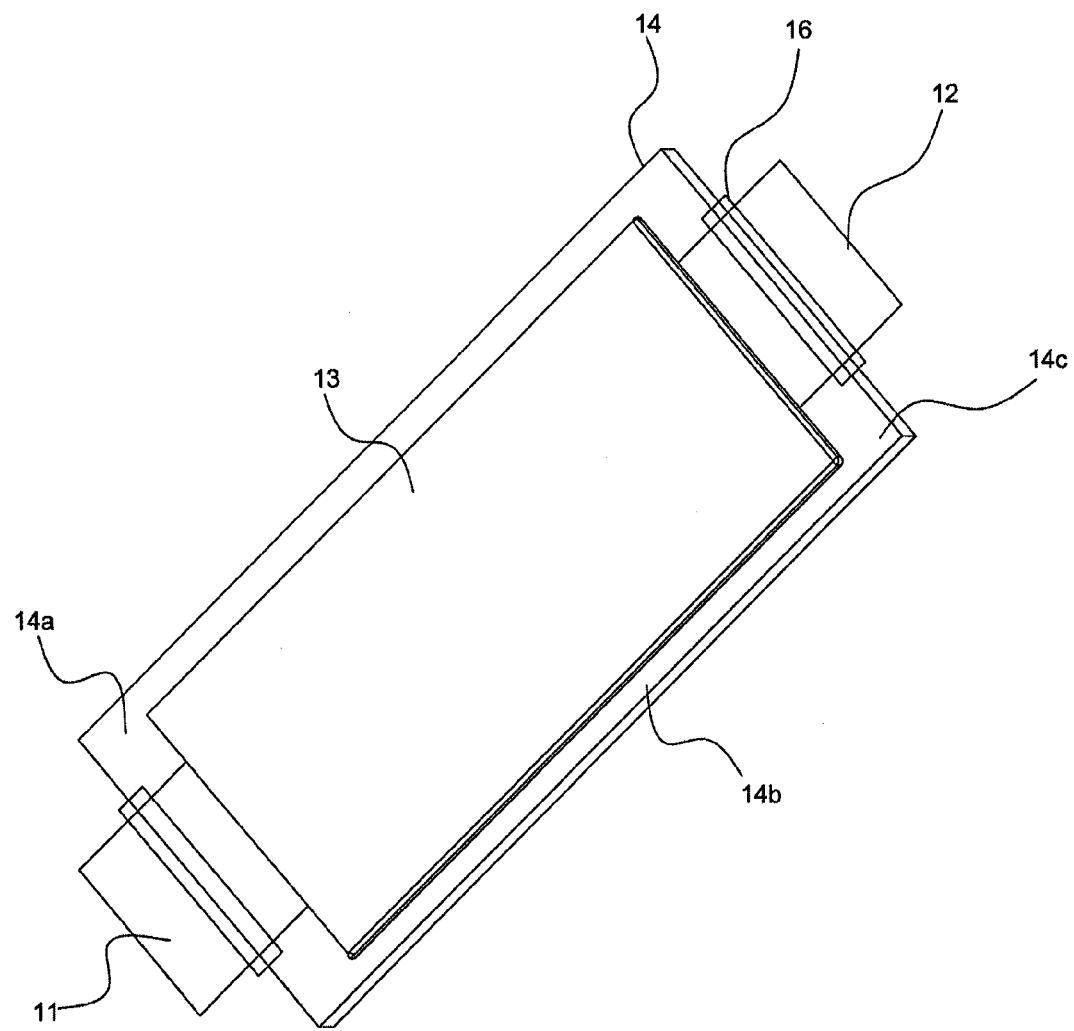
FIG. 1 is a perspective view illustrating a conventional representative pouch-shaped battery.
Figure 2:
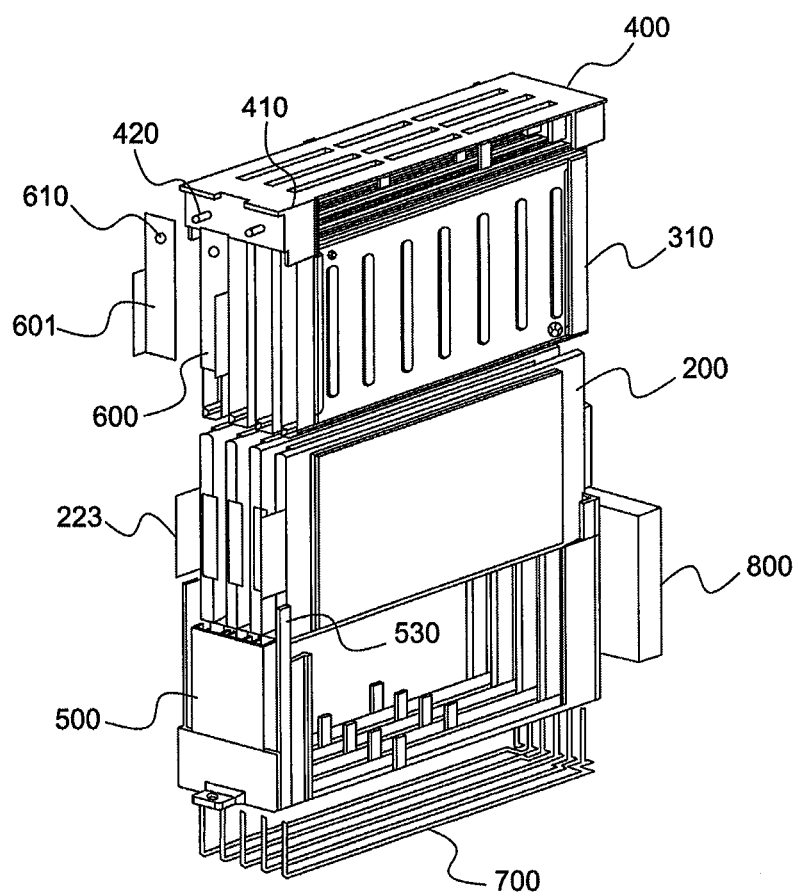
FIG. 2 is an exploded perspective view illustrating a middle- or large-sized battery module according to a preferred embodiment of the present invention.

FIG. 2 is an exploded perspective view illustrating a middle- or large-sized battery module according to a preferred embodiment of the present invention, and FIGS. 3 to 8 are typical views illustrating a process for assembling the middle- or large-sized battery module.

Referring first to FIG. 2, the middle- or large-sized battery module 100 includes a plurality of pouch-shaped battery cells 200, cell covers 310, which are metal sheathing members, for surrounding the battery cells 200 two by two, and upper and lower frame members 400 and 500 coupled with each other in an assembly-type coupling structure.

Figure 3:
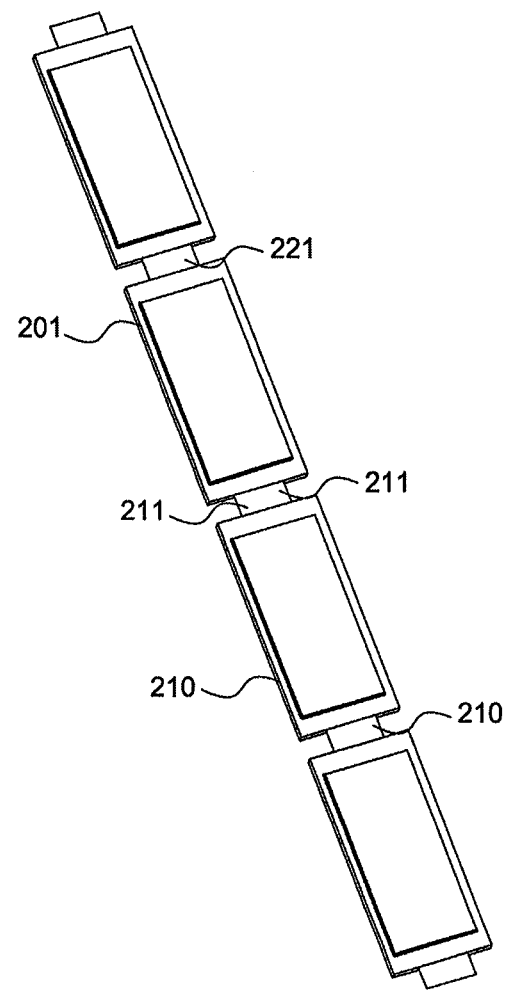
FIGS. 3 to 8 are typical views illustrating a process for assembling the middle- or large-sized battery module shown in FIG. 2.

As shown in FIG. 3, electrode terminals 210, 220, 211, and 221 of battery cells 200 and 201 are coupled to each other by welding while the battery cells 200 and 201 are arranged in series in the longitudinal direction such that the electrode terminals 210, 220, 211, and 221 of battery cells 200 and 201 are successively adjacent to each other. Subsequently, the battery cells 200 and 201 are bent in directions indicated by arrows such that the coupling regions of the electrode terminals 210, 220, 211, and 221 are located at the outside. As a result, the battery cells 200 and 201 are stacked while being in tight contact with each other. Subsequently, the stacked battery cells 200 and 201 are surrounded, two by two, by the cell covers 310, as shown in FIG. 2. As a result, unit modules 300 having a structure shown in FIG. 4 are constructed.

Figure 4:
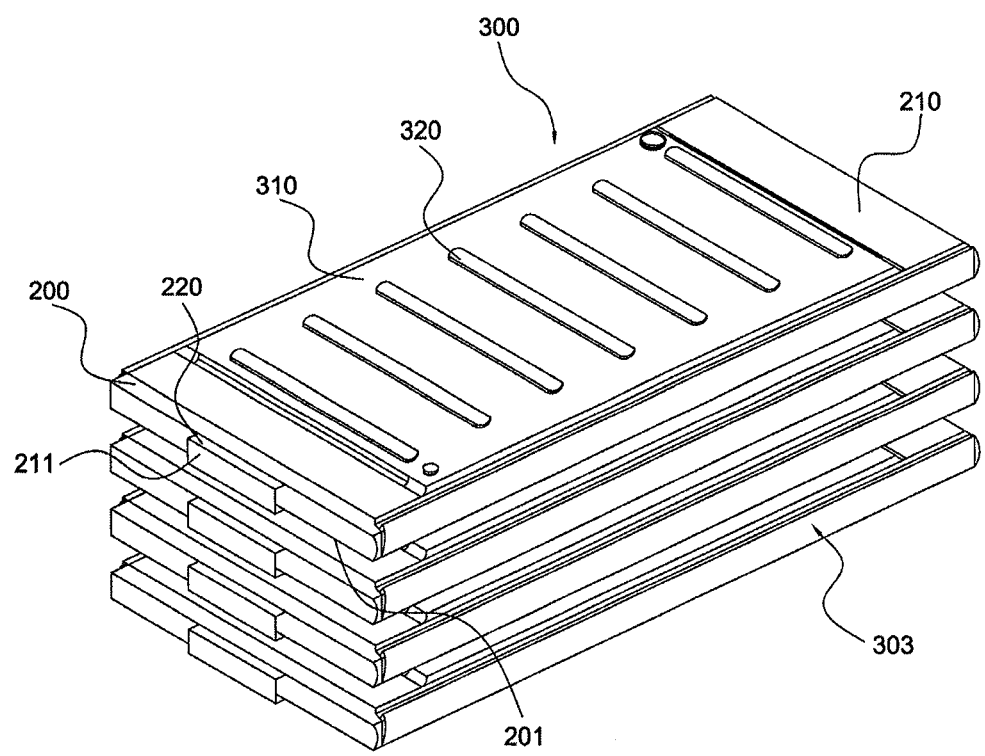
Figure 5:
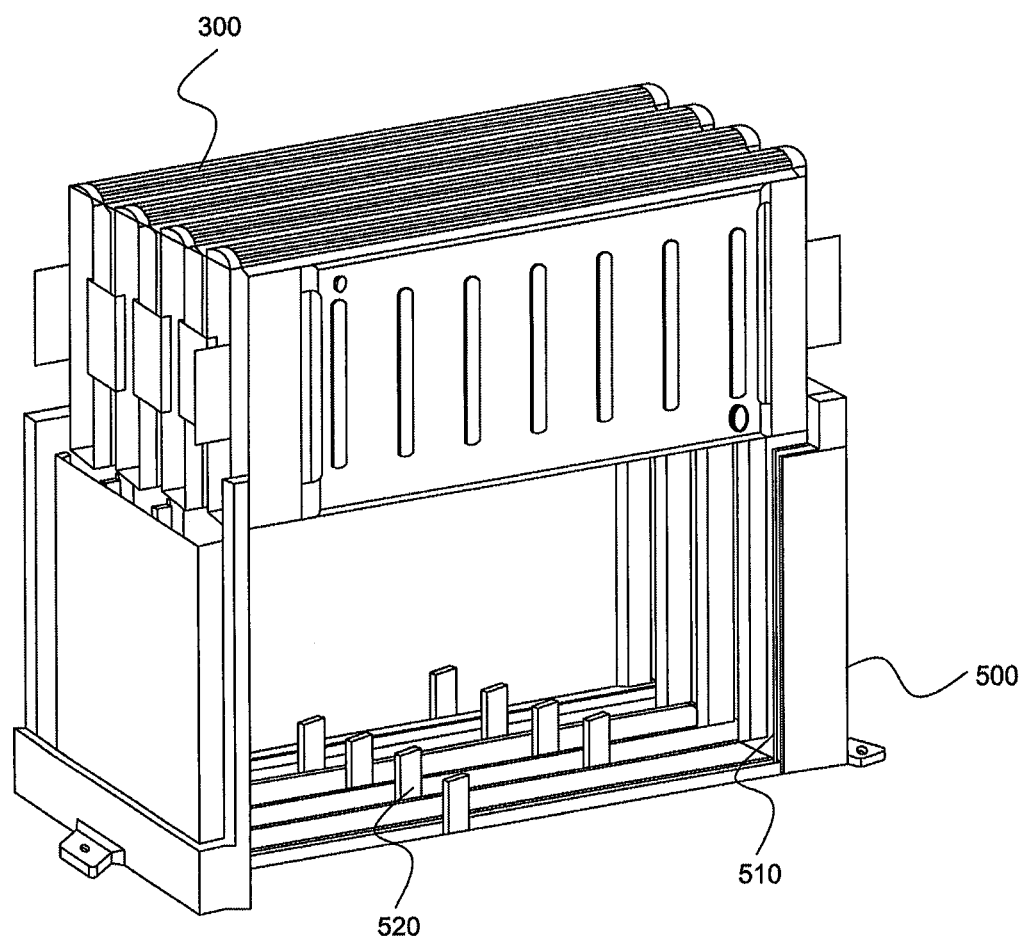

Referring to FIG. 4, each battery cell 200 has low mechanical strength because the outer surface of each battery cell 200 is constituted by a pouch-shaped case; however, the battery cells 200 are surrounded by the high-strength cell covers 310 with the result that the battery cells 200 are safe from external impacts. Also, the change in volume of the battery cells 200 is restrained by the cell covers 300 during the charge and discharge of the battery cells. Consequently, it is possible to effectively prevent the separation between electrodes of an electrode assembly mounted in each battery cell 200 and to separation between sealing parts of the pouch-shaped case.

The electrode terminals 220 and 211 of the battery cells 200 and 201 are connected with each other by welding. Consequently, the electrical connection between the battery cells 200 and 201 is stably accomplished without using an additional coupling member. In opposite major sides of each cell cover 310 are formed pluralities of grooves 320 which are spaced from each other at predetermined intervals. Consequently, a coolant channel is naturally formed while the battery cells 200 and 201 are stacked, whereby effective heat dissipation is accomplished.

Electrode terminals 210 of the outermost unit modules 300 and 303, which are not coupled with each other, will be connected to an external circuit afterward.

The unit modules stacked as described above are fitted vertically into a lower frame member 500 having partitions formed at the inside thereof with the result that the unit modules are securely mounted in the lower frame member 500. The partitions are defined by grooves 510 formed in the inside of the upper end (the front part in the drawing) and the inside of the lower end (the rear part in the drawing) of the lower frame member 500 such that the grooves 510 have a size corresponding to the upper and lower ends of the unit modules 300 and partition walls 520 protruding from the inside of the lateral side (the bottom part in the drawing) of the lower frame member 500 such that the partition walls 520 are interposed between the lateral sides of the unit modules. The lower frame member 500 is constructed approximately in a "["-shaped structure. Consequently, most of the opposite major sides of the unit modules 300 mounted in the lower frame member 500 are exposed to the outside, whereby the dissipation of heat from the unit modules 300 is accomplished.

Referring back to FIG. 2, the lower frame member 500 is provided at one side thereof with a hook 530, which is inserted into a coupling hole 410 formed in the upper frame member 400 such that the lower frame member 500 is coupled with the upper frame member 400. Consequently, the stable coupling between the lower frame member 500 and the upper frame member 400 is easily accomplished without using an additional coupling member.

Figure 6:
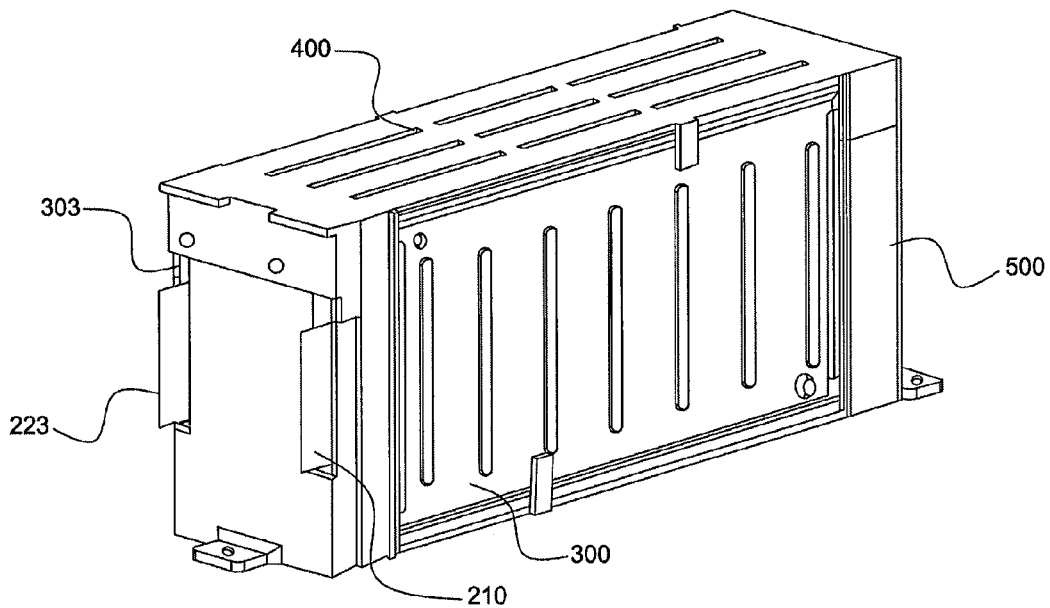

FIG. 6 is a perspective view illustrating the coupling between the lower frame member 500, in which the unit modules 300 are mounted, and the upper frame member 400. The upper frame member 400 is also provided at the inside thereof with partition walls (not shown), which are interposed between the lateral sides of the unit modules 300.

One-side electrode terminals 210 and 223 of the outermost unit modules 300 and 303 protrude forward. To these electrode terminals 210 and 223 are coupled bus bars 600 and 601, which are shown in FIG. 2. Each of the bus bars 600 and 601 is bent at one side thereof such that the bus bars 600 and 601 can be coupled to the electrode terminals 210 and 223 without bending the electrode terminals 210 and 223. Also, the bus bars 600 and 601 are provided with coupling holes 610, through which coupling protrusions 420 formed at the upper frame member 400 are inserted such that the bus bars 600 and 601 are securely mounted to the upper frame member 400 while the bus bars 600 and 601 are coupled to the electrode terminals 210 and 223.

Figure 7:
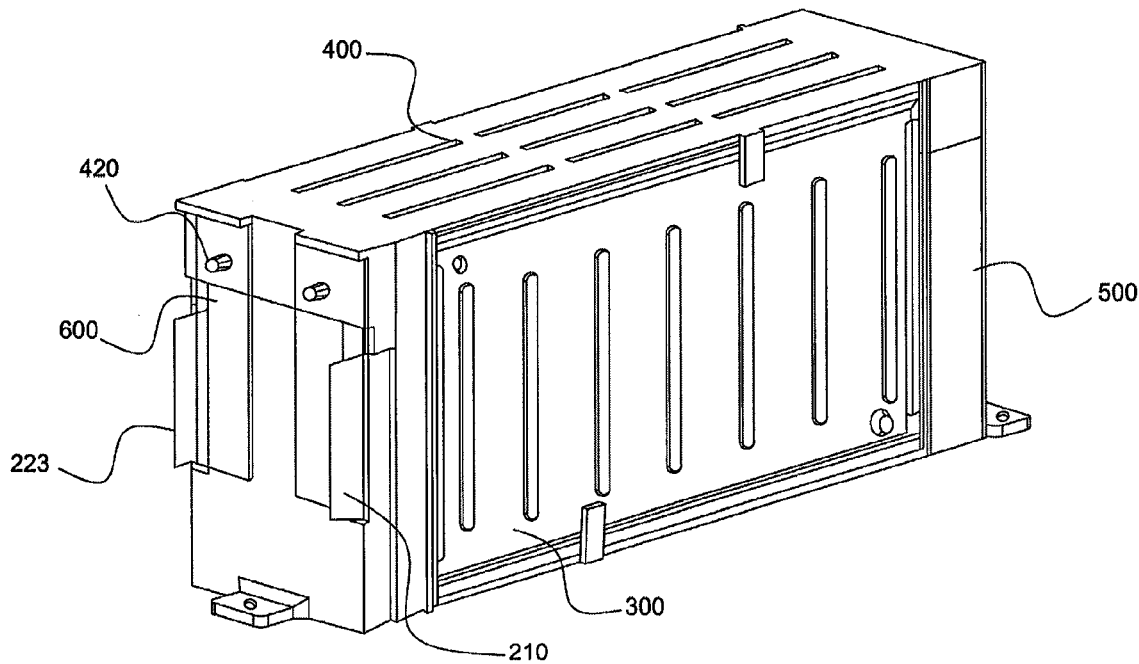

FIG. 7 is a perspective view typically illustrating the coupling between the bus bars and the electrode terminals. Referring to FIG. 7, the electrode terminal 210 of the unit module 300 is in tight contact with the vertically bent side 620 of the bus bar 600, and therefore, resistance welding can be easily carried out. At the same time, the bus bar 600 is coupled to the upper frame member 400 through the insertion of the coupling protrusions 420 into the coupling holes 610. Consequently, the stably mounted state of the bus bar 600 is maintained although vibration or impact is applied to the bus bar 600.

Referring back to FIG. 2, sensing wires 700 for sensing the voltage and temperature of the battery cells 200 and 201 are connected to the lower frame member 500. Specifically, the sensing wires 700 are connected to the electrode terminal coupling regions at the upper and lower ends of the lower frame member 500 for sensing the voltage of the unit modules 300 in approximately the same shape as the lower frame member 500. Consequently, the battery module is constructed in a simple structure.

Figure 8:
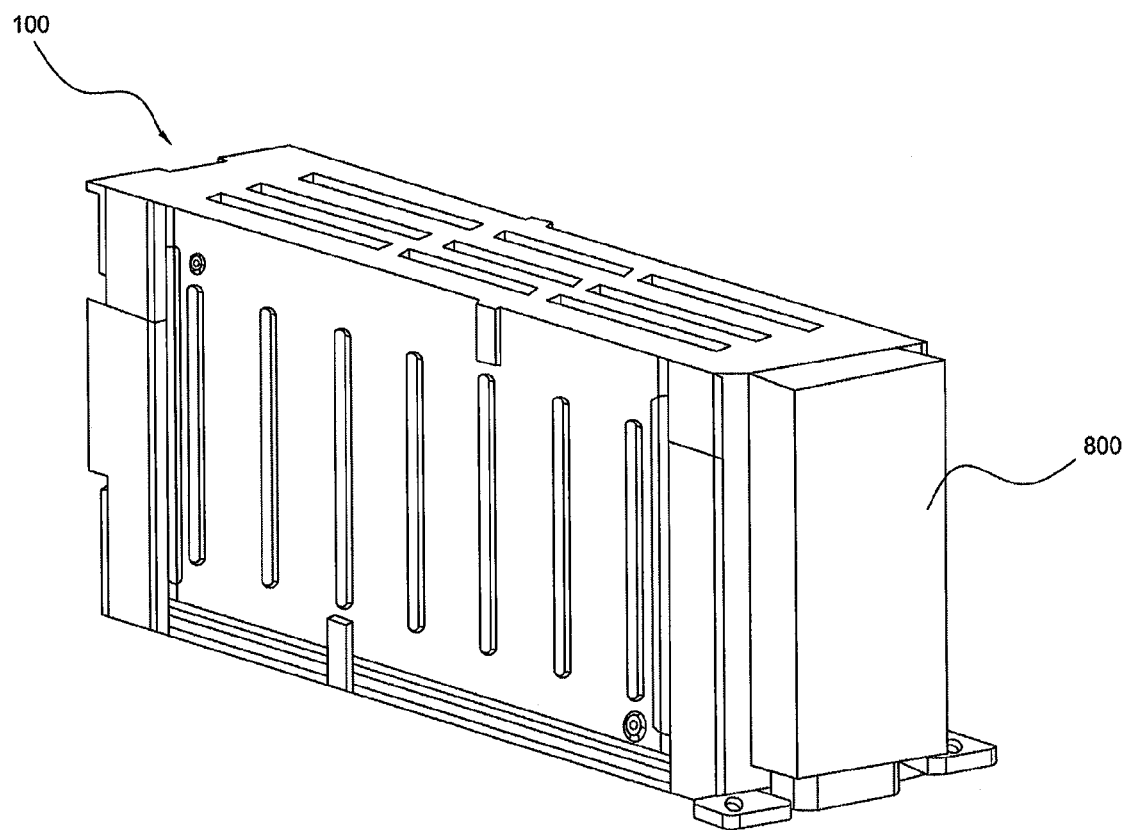

The sensing wires 700 are connected to a battery management system (BMS) 800 located at the bottom of the lower frame member 500. FIG. 8 is a perspective view typically illustrating the rear of the middle- or large-sized battery module 100 to which the BMS 800 is mounted.

Figure 9:
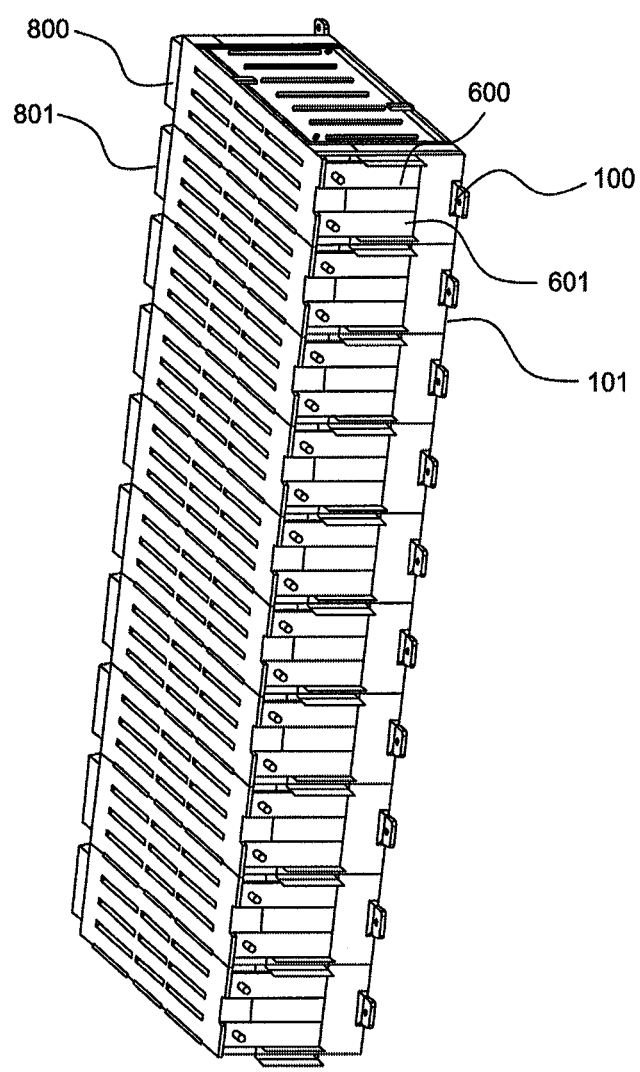
FIG. 9 is a typical view illustrating a middle- or large-sized battery system manufactured by stacking a plurality of battery modules, one of which is illustrated in FIG. 2.

A plurality of battery modules may be stacked, as shown in FIG. 9, to construct a middle- or large-sized battery system having desired output and capacity.

Referring to FIG. 9, the middle- or large-sized battery system is manufactured by stacking a plurality of battery modules 100 and 101. The bus bars 600 and 601 are located at the front of the middle- or large-sized battery system, and the BMSs 800 and 801 are located at the rear of the middle- or large-sized battery system.

The bus bars 600 and 601 may be electrically connected to each other via connection members (not shown), such as wires, metal plates, printed circuit boards (PCBs), flexible PCBs. In addition, an additional BMS (not shown) may be mounted to the middle- or large-sized battery system for controlling the overall operation of the battery system. In this case, the BMSs 800 and 801 mounted to the respective battery modules 100 and 101 serve as slave BMSs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the present invention has the effect of easily mounting a sensing unit that is capable of minimizing the weight and size of battery cells while effectively reinforcing the low mechanical strength of the battery cells and sensing the operation state of the battery cells to a middle- or large-sized battery module. In addition, the present invention has the effect of manufacturing the battery module by a simple assembly process without using a plurality of members for mechanical coupling and electrical connection, thereby decreasing the manufacturing costs of the battery module, and effectively preventing the battery module from being short-circuited or damaged during the manufacture or the operation of the battery module. Furthermore, the present invention has the effect of manufacturing a middle- or large-sized battery system having desired output and capacity using the battery module as a unit body.

What is claimed is:
1. A middle- or large-sized battery module comprising:
   two or more unit modules each having two or more plate-shaped battery cells, as unit cells, each unit module surrounded by its own high-strength sheathing member made of synthetic resin or metal, each sheathing member having opposite major sides including pluralities of grooves formed therein; and separable upper and lower frame members coupled with each other in an assembly-type coupling structure such that the unit modules are vertically mounted in the upper and lower frame members, wherein the upper and lower frame members are provided at insides thereof with pluralities of partitions for guiding the vertical mounting operation of the respective unit modules, and wherein all of the battery cells of the two or more unit modules of the battery module are arranged in series such that electrode terminals of successively adjacent battery cells are coupled to each other, the series of battery cells being bent by twos or more such that the battery cells are stacked, and the stacked battery cells being surrounded by predetermined numbers with the sheathing member, the battery module further comprising:

first and second bus bars each being bent at a side thereof and each being in direct contact with an electrode terminal of only one unit module without bending the respective electrode terminal, for electrically connecting the electrode terminals to external circuits or electrode terminals of neighboring battery modules, wherein the bus bars are provided with coupling holes, and one of the upper and lower frame members corresponding to the bus bars is provided at an outside thereof with coupling protrusions corresponding to the coupling holes.

2. The battery module according to claim 1, wherein each plate-shaped battery cell is a secondary battery constructed in a structure in which an electrode assembly is mounted in a battery case made of a laminate sheet including a resin layer and a metal layer, and electrode terminals protrude from upper and lower ends of the battery case.

3. The battery module according to claim 2, wherein each battery cell is a pouch-shaped battery cell constructed in a structure in which the electrode assembly is mounted in a pouch-shaped battery case made of an aluminum laminate sheet.

4. The battery module according to claim 1, wherein the upper and lower frame members are open in a lateral direction such that edges of the unit modules are fixed to the upper and lower frame members.

5. The battery module according to claim 1, wherein the partitions include (i) grooves formed in the inside of the upper and lower frame members such that edges of the unit modules are inserted into the grooves formed in the inside of the upper and lower frame members, (ii) partition walls for assisting the edges of the unit modules to be stably mounted in the grooves formed in the inside of the upper and lower frame members, or (iii) the grooves formed in the inside of the upper and lower frame members and partition walls.

6. The battery module according to claim 1, wherein the assembly-type coupling structure is a structure including a hook formed at one of the upper and lower frame members and a coupling hole formed in the other of the upper and lower frame members such that the coupling hole corresponds to the hook.

7. The battery module according to claim 1, further comprising:

a sensing unit mounted along one of the frame members for sensing (i) a voltage, (ii) a temperature, or (iii) the voltage and the temperature of the battery cells.

8. The battery module according to claim 1, further comprising:

a battery management system mounted at a side of the battery module opposite from a side thereof where the bus bars are located for controlling the operation of the battery module.

9. A middle- or large-sized battery system comprising a plurality of the battery module according to claim 1.

10. An electric vehicle comprising the battery system according to claim 9 as a power source.

11. A hybrid electric vehicle comprising the battery system according to claim 9 as a power source.

12. An electric motorcycle comprising the battery system according to claim 9 as a power source.

13. An electric bicycle comprising the battery system according to claim 9 as a power source.

14. The battery module according to claim 2, wherein the electrode assembly of each plate-shaped battery cell includes cathodes and anodes stacked in a first direction, and the battery cells are stacked along the first direction.

15. A middle- or large-sized battery module comprising:

two or more unit modules each having two or more plate-shaped battery cells, as unit cells, each unit module surrounded by its own high-strength sheathing member made of synthetic resin or metal; and separable upper and lower frame members coupled with each other in an assembly-type coupling structure such that the unit modules are vertically mounted in the upper and lower frame members, wherein the upper and lower frame members are provided at insides thereof with pluralities of partitions for guiding the vertical mounting operation of the respective unit modules, wherein the battery cells are arranged in series such that electrode terminals of successively adjacent battery cells are coupled to each other, the series of battery cells being bent by twos or more such that the battery cells are stacked, and the stacked battery cells being surrounded by predetermined numbers with the sheathing member, the bent connection between electrode terminals of successively adjacent battery cells being the only bent connection between successively adjacent battery cells, wherein each plate-shaped battery cell is a secondary battery constructed in a structure in which an electrode assembly is further mounted in its own battery case different from the high-strength sheathing member, the battery case made of a laminate sheet including a resin layer and a metal layer, the electrode assembly of each plate-shaped battery cell includes cathodes and anodes stacked in a first direction, and the battery cells are stacked along the first direction, wherein each battery case defines two length edges and two width edges in a plane perpendicular to the first direction of the stacked cathodes and anodes, the length edges being longer than the width edges, and wherein the electrode terminals of each battery cell include a first electrode terminal protruding outwardly from one of the width edges of the battery case and a second electrode terminal protruding outwardly from the other of the width edges of the battery case.

16. The battery module according to claim 15, wherein each battery cell is a pouch-shaped battery cell constructed in a structure in which the electrode assembly is mounted in a pouch-shaped battery case made of an aluminum laminate sheet.

17. The battery module according to claim 1,
wherein the assembly-type coupling structure of the upper and lower frame members includes two oppositely facing lateral sides spaced apart along the first direction, each lateral side including an opening that is open to the environment exterior to the battery module such that edges of the unit modules are fixed to the upper and lower frame members.

* * * * *